US008832813B1

(12) United States Patent
Cai et al.

(10) Patent No.: US 8,832,813 B1
(45) Date of Patent: Sep. 9, 2014

(54) VOICE AUTHENTICATION VIA TRUSTED DEVICE

(71) Applicant: EMC Corporation, Hopkinton, MA (US)

(72) Inventors: Ke Cai, Shanghai (CN); Ian Farquhar, Sydney (AU); Shen Peng, Shanghai (CN); Todd A. Morneau, Sudbury, MA (US); Weiwei Qian, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/719,547

(22) Filed: Dec. 19, 2012

(51) Int. Cl.
  *G06F 21/00* (2013.01)
  *G06F 21/32* (2013.01)
  *G06F 21/57* (2013.01)
  *H04L 29/06* (2006.01)

(52) U.S. Cl.
  CPC ........... *G06F 21/32* (2013.01); *G06F 21/57* (2013.01); *H04L 63/0869* (2013.01)
  USPC .......................................................... 726/7

(58) Field of Classification Search
  CPC ..... G06F 21/57; H04L 9/3231; H04L 9/3234; H04L 63/0869; H04W 12/06
  USPC .......................................................... 726/7
  See application file for complete search history.

(56) References Cited

U.S. PATENT DOCUMENTS

| 7,386,448 | B1* | 6/2008 | Poss et al. ............... 704/247 |
| 8,494,576 | B1* | 7/2013 | Bye et al. ............... 455/550.1 |
| 8,533,485 | B1* | 9/2013 | Bansal et al. ............... 713/186 |
| 8,620,666 | B1* | 12/2013 | Whitmore et al. ............ 704/273 |
| 2004/0193871 | A1* | 9/2004 | Seshadri .................. 713/154 |
| 2007/0160084 | A1* | 7/2007 | Haas ....................... 370/493 |
| 2007/0185718 | A1* | 8/2007 | Di Mambro et al. ......... 704/273 |
| 2009/0049307 | A1* | 2/2009 | Lin ........................ 713/185 |
| 2009/0319270 | A1* | 12/2009 | Gross ...................... 704/246 |
| 2012/0084545 | A1* | 4/2012 | Farina et al. .............. 713/2 |
| 2013/0305333 | A1* | 11/2013 | Katzer et al. .............. 726/7 |
| 2013/0318576 | A1* | 11/2013 | Prakash et al. ............ 726/4 |

* cited by examiner

*Primary Examiner* — Hadi Armouche
*Assistant Examiner* — Shahriar Zarrineh
(74) *Attorney, Agent, or Firm* — Ryan, Mason & Lewis, LLP

(57) ABSTRACT

Techniques for secure voice authentication. In one example, a method includes the following steps. A first computing device initiates establishment of a secure channel between the first computing device and a second computing device. The first computing device includes a trusted device and the second computing device at least partially hosts a service that a user of the trusted device seeks to access. A prompt is received at the first computing device from the second computing device over the secure channel. The prompt requests a user voice response for use in making an authentication decision for the user based on the user voice response.

16 Claims, 3 Drawing Sheets

VOICE AUTHENTICATION VIA TRUSTED DEVICE

FIELD

The field relates to security techniques, and more particularly to techniques for enabling secure voice authentication.

BACKGROUND

In order to perform an online transaction in a distributed computing system such as, for example, an online transaction system accessible via the Internet, a user is often required to authenticate himself/herself to the system. This authentication takes place prior to the user being permitted to perform the transaction or otherwise gain access to an application or computing resource that supports the actual transaction. There are many existing challenge-response mechanisms available that can be used by such online transaction systems that are intended to authenticate the user.

Furthermore, while data transmitted over the Internet is typically encrypted, there are many chances for hackers to steal important user information via mechanisms such as a key-logger (a program that secretly records key strokes of the user and transmits them to a hacker), a mouse-tracker (a program that secretly records mouse clicks of the user and transmits them to a hacker), or other malicious software (so-called "malware") resident on the computing device of the user. Generally speaking, for most input hardware devices already integrated in a personal computer, they can be easily hacked. Even in the case of voice authentication (the process of authenticating a user via voice biometrics), a bugging device can be planted on the audio channel to steal voice data and thus voice biometric information of the user.

SUMMARY

Embodiments of the invention provide techniques for secure voice authentication.

In one embodiment, a method comprises the following steps. A first computing device initiates establishment of a secure channel between the first computing device and a second computing device. The first computing device comprises a trusted device and the second computing device at least partially hosts a service that a user of the trusted device seeks to access. A prompt is received at the first computing device from the second computing device over the secure channel. The prompt requests a user voice response for use in making an authentication decision for the user based on the user voice response.

In one example, the user voice response is sent from the first computing device to the second computing device over the secure channel for use by the second computing device in making an authentication decision for the user based on the user voice response. In another example, the authentication decision can be made at the first computing device based on the user voice response.

In another embodiment of the invention, a computer program product is provided which comprises a processor-readable storage medium having encoded therein executable code of one or more software programs. The one or more software programs when executed by one or more computing devices implement steps of the above-described method.

In yet another embodiment of the invention, an apparatus comprises a memory and one or more processors operatively coupled to the memory and configured to perform steps of the above-described method.

Advantageously, illustrative embodiments of the invention provide techniques for improving the security of voice authentication by utilizing a hardware root of trust, in the form of a trusted device, to assist in the user authentication process.

These and other features and advantages of the present invention will become more readily apparent from the accompanying drawings and the following detailed description.

DETAILED DESCRIPTION

Embodiments of the invention will be described herein with reference to exemplary computing systems and associated servers, computers, storage units and devices and other processing devices. It is to be appreciated, however, that embodiments of the invention are not restricted to use with the particular illustrative system and device configurations shown. Moreover, the phrase "computing system" as used herein is intended to be broadly construed, so as to encompass, for example, private or public cloud computing or storage systems, as well as other types of systems comprising distributed virtual infrastructure. However, a given embodiment may more generally comprise any arrangement of one or more processing devices.

As mentioned above, embodiments of the invention provide techniques for improving the security of voice authentication by utilizing a trusted device (e.g., as a hardware root of trust) to assist in a user authentication process. As used herein, a "trusted device" refers to a device that is considered secure for some intended purpose, e.g., secure against hackers with respect to performing a voice authentication procedure.

In one embodiment, techniques are provided to authenticate a user to a server or a set of servers (e.g., a cloud computing or storage system) using a voice recorder functionality embedded into a trusted hardware peripheral (e.g., a security token) inserted into, or otherwise operatively coupled to, the user's computing device (e.g., client endpoint). Locating the voice recorder functionality inside a secure hardware peripheral makes it less likely that voice data used to authenticate the user will be stolen and used for fraudulent purposes (i.e., an attempt to impersonate the user to perform an online transaction). Also, by providing a mutually authenticated and encrypted channel, embodiments of the invention substantially ensure that the voice data is immune to a so-called "Man-in-the-Middle" attack (e.g., where a computing device is fraudulently placed between the user computing device and the server to intercept and possibly alter communications there between while making the user and the server believe that they are exclusively communicating with each other).

Figure 1A:
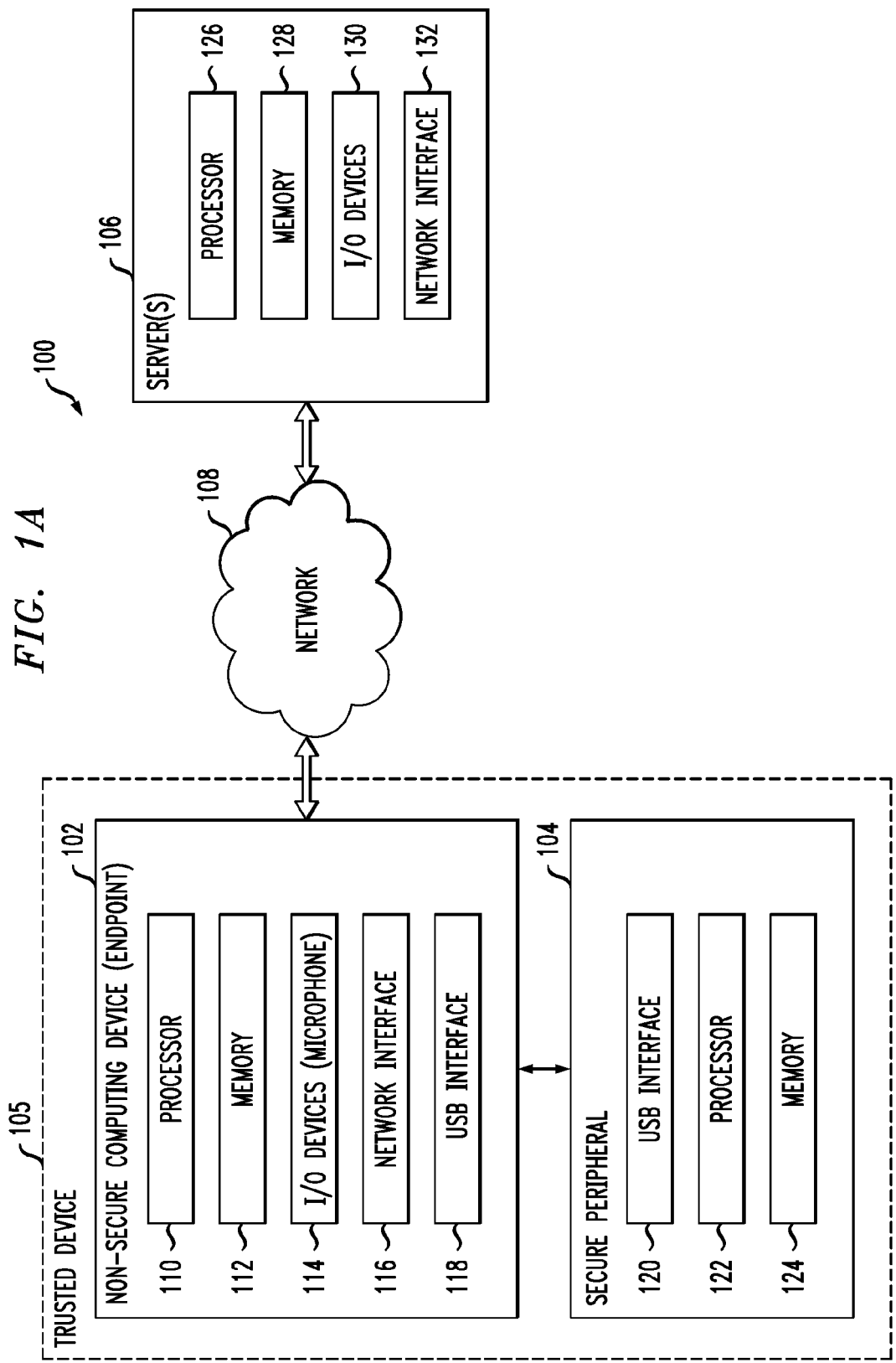
FIG. 1A illustrates a distributed computing system implementing secure voice authentication in accordance with one embodiment of the invention.

FIG. 1A illustrates a distributed computing system implementing secure voice authentication in accordance with one embodiment of the invention. As shown, distributed computing system 100 comprises a non-secure user computing device 102 and a secure peripheral device 104, the combination of which is referred to as a trusted device 105. The trusted device 105 communicates with one or more servers 106 over a network 108 in a secure manner. The network 108 may comprise, for example, a global computer network such as the Internet, a wide area network (WAN), a local area network (LAN), a satellite network, a telephone or cable network, or various portions or combinations of these and other types of networks. Embodiments of the invention are not intended to be limited to any particular type of network.

Note that the user computing device 102 is considered "non-secure" in the sense that, alone (without the secure peripheral device 104), the computing device is susceptible to being hacked, for example, via a bugging device being planted on an audio channel to steal voice data and thus voice biometric information of the user. The secure peripheral device 104 is considered "secure" in the sense that it is not susceptible to being hacked in this or any other manner. The secure peripheral device 104 makes the otherwise non-secure computing device 102 secure in the sense that the computing device 102, when operatively coupled to the secure peripheral device 104, can participate in a voice authentication procedure with the one or more servers 106 without making the overall trusted device 105 vulnerable to hackers trying to steal the voice data used in the authentication procedure.

In one embodiment, the secure peripheral device 104 is a security token and may be implemented, for example, using the RSA SecurID® user authentication token commercially available from RSA Security Inc. of Bedford, Mass., and adapted for use in the system 100. In such an implementation, the secure peripheral device 104 is connected to the user computing device 102, for example, via a Universal Serial Bus (USB) interface. In an alternative embodiment, the secure peripheral device 104 is connected to the user computing device 102 via local wireless connectivity (e.g., WiFi, Bluetooth, etc.). Embodiments of the invention are not intended to be limited to any particular type of communications protocol.

As shown in FIG. 1A, user computing device 102 comprises a processor 110, a memory 112, input/output devices 114 (including a microphone for capturing voice responses or other voice data of the user), a network interface 116 and a USB interface 118. The secure peripheral device 104 comprises a USB interface 120, a processor 122 and a memory 124. While not expressly shown, device 104 may comprise input/output devices as well. The respective USB interface modules in the user computing device 102 and the secure peripheral device 104 allow the two devices to communicate using the USB protocol. However, one or more other communications protocols, including combinations thereof, may be employed in place of the USB protocol. Further, the server 106 (or each server when more than one server) in FIG. 1A comprises a processor 126, a memory 128, input/output devices 130 and a network interface 132.

One or more of the elements of system 100 may each run on a server, computer or other processing platform element, which may be viewed as an example of what is more generally referred to herein as a "processing device." As illustrated in FIG. 1A, such a device generally comprises at least one processor, an associated memory, and various interfaces, and implements one or more functional modules for controlling certain features of system 100. Again, multiple elements or modules may be implemented by a single processing device in a given embodiment.

The user computing device 102 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device.

The processor (110, 122 and 126) may comprise a microprocessor, a microcontroller, an application-specific integrated circuit (ASIC), a field programmable gate array (FPGA) or other type of processing circuitry, as well as portions or combinations of such circuitry elements. The memory (112, 124 and 128) may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the device 102, device 104 or server 106 causes the device to perform functions associated with one or more of the elements of system 100. One skilled in the art would be readily able to implement such software given the teachings provided herein. Other examples of computer program products embodying embodiments of the invention may include, for example, optical or magnetic disks.

The input/output devices (114 and 130) may comprise one or more mechanisms for inputting data to the processor (e.g., microphone, keyboard, keypad or pointing device), and one or more mechanisms for providing results or otherwise presenting information associated with the processor (e.g., display, screen or other form of presentation device). Again, the secure peripheral device may also have input/output devices.

The network interface (116 and 132) comprises circuitry that serves to interface the computing device with a network (e.g., network 108) and/or other system components. Such circuitry may comprise conventional transceivers of a type well known in the art.

The computing system 100 may comprise additional known components (not expressly shown) such as parallel processing systems, physical machines, virtual machines, virtual switches, storage volumes, etc. Again, the computing system architecture shown in the figure is presented by way of example only, and system 100 may include additional or alternative computing architectures, as well as numerous distinct computing architectures in any combination.

Also, numerous other arrangements of servers, computers, storage devices or other components are possible in the system 100. Such components can communicate with other elements of the security system 100 over any type of network or networks.

Furthermore, it is to be appreciated that the system 100 of FIG. 1A can comprise virtual machines (VMs) implemented using a hypervisor. A hypervisor is an example of what is more generally referred to herein as "virtualization infrastructure." The hypervisor runs on physical infrastructure. As such, the voice authentication techniques illustratively described herein can be provided as one or more cloud services. The cloud services thus run on respective ones of the virtual machines under the control of the hypervisor. System 100 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the system 100 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX and Symmetrix VMAX, both commercially available from EMC Corporation of Hopkinton, Mass. A variety of other computing and storage products may be utilized to implement at least a portion of the cloud services.

Figure 1B:
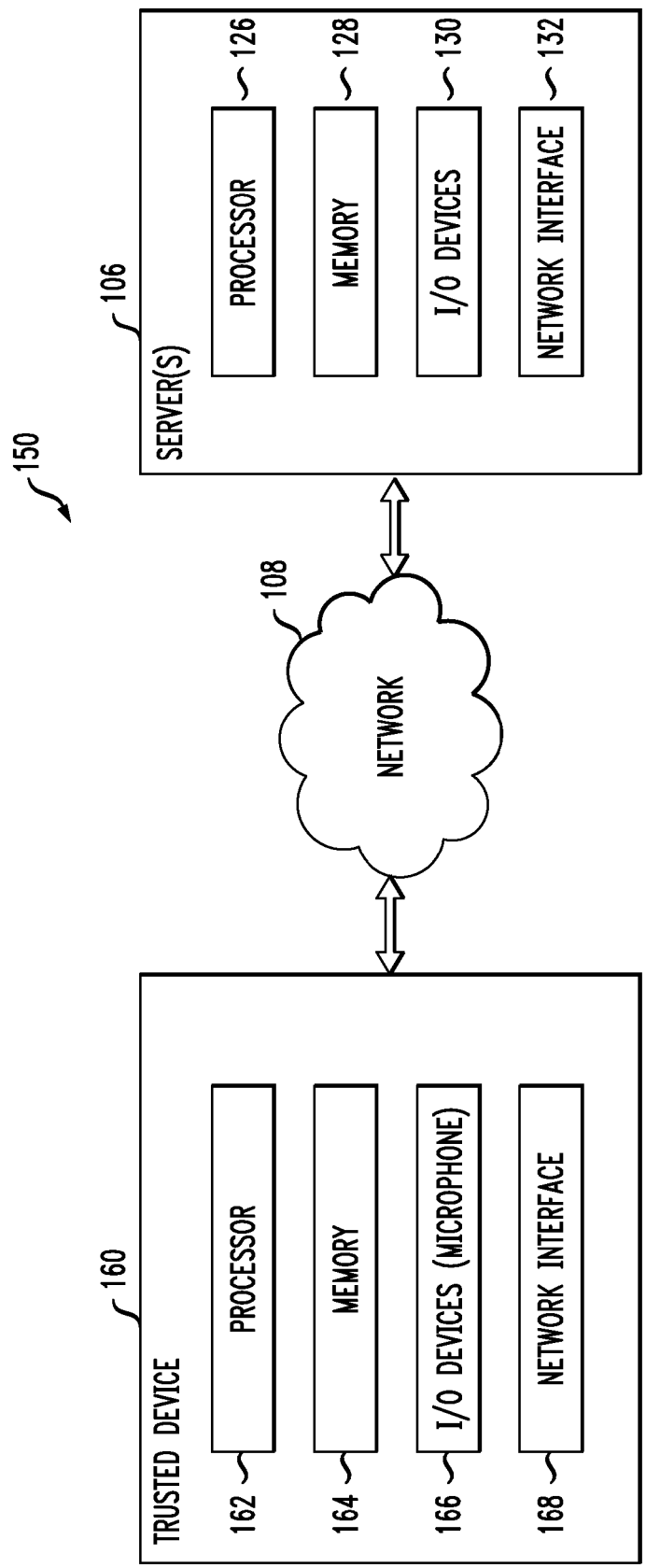
FIG. 1B illustrates a distributed computing system implementing secure voice authentication in accordance with another embodiment of the invention.

FIG. 1B illustrates a distributed computing system implementing secure voice authentication in accordance with another embodiment of the invention. System 150 in FIG. 1B is similar to system 100 in FIG. 1A from the perspective of the one or more servers 106 and the network 108. However, a main difference is in the composition of the trusted device. Recall in the FIG. 1A embodiment, the non-secure user computing device 102 and the secure peripheral device 104, coupled via respective USB interfaces, formed the trusted device. In the FIG. 1B embodiment, it is assumed that a trusted device 160 is a single device (e.g., one common housing for all elements of the device) with the same or similar security capabilities as secure peripheral device 104, and includes a built-in microphone (and possibly other input/output devices) as well as an interface for communicating directly over the network 108.

Note that processor 162, the memory 164, input/output devices 166 and network interface 168 of device 160 function in the same or similar manner as like components described above in the context of FIG. 1A. Device 160 may be a security token that is able to communicate through network 108 with the one or more servers 106, for example, the RSA SecurID® user authentication token commercially available from RSA Security Inc. of Bedford, Mass., adapted for use in the system 150. Other security tokens capable of direct network communication (i.e., not needing another user computing device through which to attach to a network) may be employed as the trusted device 160.

Figure 2:
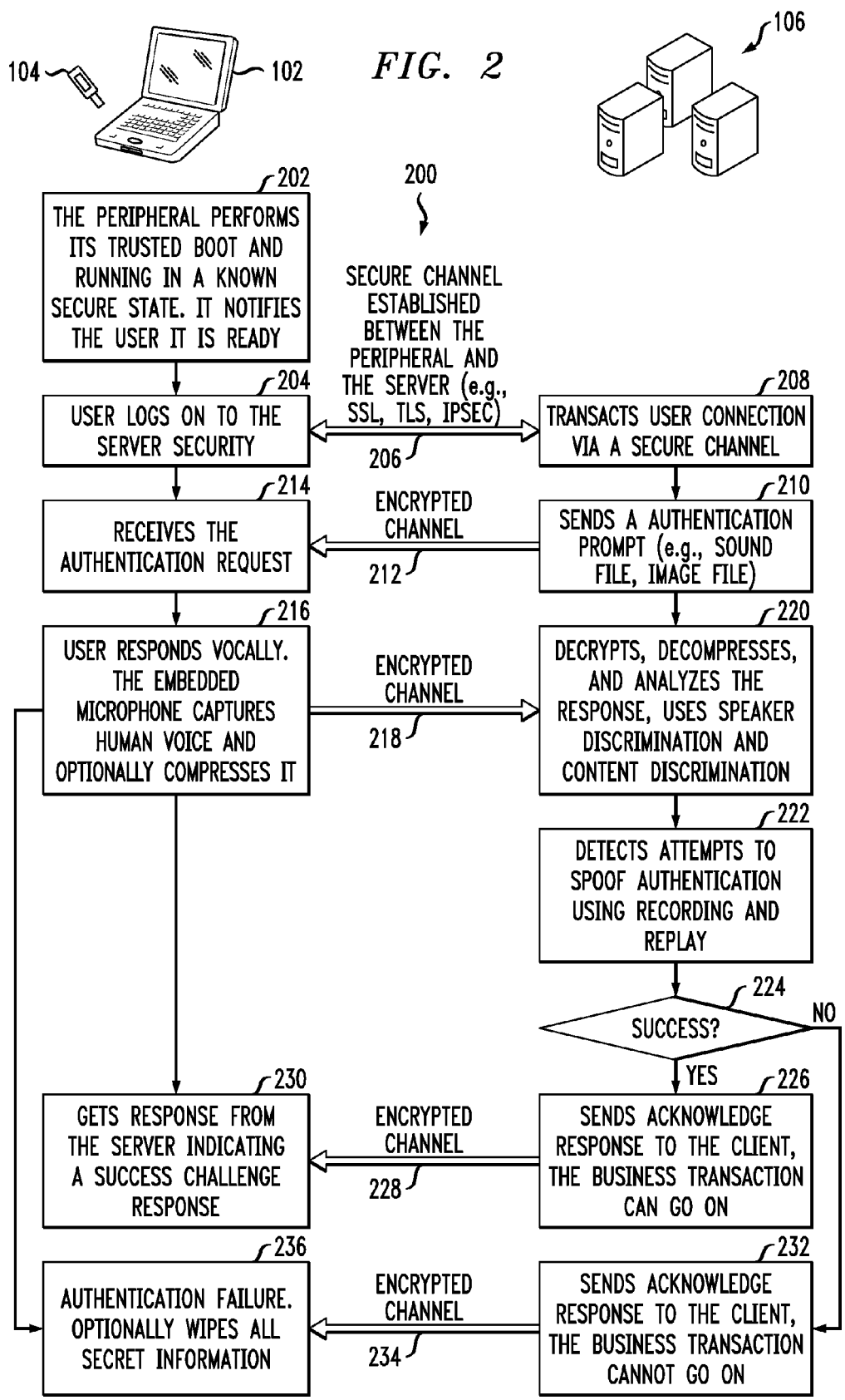
FIG. 2 illustrates a secure voice authentication methodology in accordance with one embodiment of the invention.

FIG. 2 illustrates a secure voice authentication methodology in accordance with one embodiment of the invention. Note that FIG. 2 illustrates a secure voice authentication methodology 200 from the perspective of the computing system 100 of FIG. 1A. However, it is to be understood that the same methodology may be implemented from the perspective of the computing system 150 of FIG. 1B.

Thus, when referring to the "peripheral device" below in the context of FIG. 2, it is meant to refer to the secure peripheral device 104, and when referring to an "endpoint device" below in the context of FIG. 2, it is meant to refer to the user computing device 102.

In one embodiment, the peripheral device is assumed to have at least one or more of the following attributes: (i) the ability to perform a trusted boot from an internal root of trust and to execute in a known secure state; (ii) the ability to establish a secure channel (e.g., Secure Sockets Layer (SSL)/Transport Layer Security (TLS), Internet Protocol Security (IPSEC), etc.) and to provide secure storage for certificates or other authentication files/keys; (iii) immune to malicious software (e.g., malware that performs Remote Procedure Call (RPC) attacks) on the endpoint device; and (iv) tamper-resistant. The peripheral device may also have tamper-detection capability such that any attempt to breach or otherwise hack the peripheral device will result in destruction of certificates or other authentication files/keys and voice data stored thereon.

As such, the peripheral device maintains a "crypto boundary" there around wherein all cryptographic-related or security operations (e.g., secure booting, data encryption/decryption, data integrity check, secure connection, public key infrastructure operations, hash operations, voice recordation, voice data compression/decompression, etc.) are performed therein and thus are secure and operating in a trusted environment.

Referring now to the methodology 200 illustrated in FIG. 2, in step 202, the peripheral device runs in a known secure status after a secure boot operation. The peripheral device then notifies the endpoint device (user) that it is ready to use. Note that the endpoint device provides power to the peripheral device through the USB interface.

In step 204, the user securely logs into a remote service hosted on server 106. To do so, a secure (encrypted) channel 206 is established between the peripheral device and the server (e.g., SSL/TLS, IPSEC, etc.) using certificates or other authenticating technologies securely stored in the peripheral device.

In step 208, the server 106 transacts the user connection via the established secure channel. In step 210, the server 106 sends an authentication prompt, e.g., a sound file (but could be a non-audio prompt, such as an image file or a text file), over the encrypted channel 212. The prompt is intended to elicit a known and expected response in the user's speaking voice.

The peripheral device receives the authentication prompt in step 214. In step 216, a microphone of the endpoint device captures the user's voice response to the authentication prompt. The voice response is digitized and optionally compressed by the peripheral device. The resulting sound file (with user's voice response) is sent over the secure channel 218 to the server 106.

In step 220, the server 106 decrypts, decompresses and analyzes the voice response. The analysis comprises at least one of speaker discrimination (e.g., speaker recognition based on voice biometric information extracted from the voice response matching previously stored voice biometric information of the user) and content discrimination (e.g., speech recognition based on content determined from the voice response matching previously stored content). When, both speaker discrimination and content discrimination are implemented by the server 106, the synthesis of the speaker discrimination and content discrimination results is used to make an authentication decision, which confirms or denies access by the user to the remote service.

In step 222, authentication fraud detection is performed. This step can include detection of attempts to spoof authentication using recording and replay, using a number of known fraud detection techniques.

If the authentication decision is successful (speaker/content discrimination results confirm that user is who he/she purports to be and/or no authentication fraud is detected) as determined in step 224, then an authentication token (e.g., confirmation, key, certificate or other mechanism) or simply an accept response is sent in step 226 by the server 106 to the successfully authenticated user via encrypted channel 228. As such, when the endpoint device receives the indication of successful authentication in step 230, the user may continue the online transaction (e.g., online banking transaction, e-commerce purchase, etc.) associated with the remote service.

However, if the authentication decision is not successful (speaker/content discrimination results reject that user is who he/she purports to be and/or authentication fraud is detected) as determined in step 224, then a variety of policy driven actions can be taken in step 232. For example, an access denied message may be transmitted via encrypted channel 234 to the endpoint device for display in step 236. Alternatively, a tamper response action can be initiated in step 236 which securely wipes the peripheral device of all secret information.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   executing at a first computing device a secure boot process;
   initiating at the first computing device establishment of a secure channel between the first computing device and a second computing device, wherein the first computing device comprises a non-secure portion and a secure portion and the second computing device at least partially hosts a service that a user of the first computing device seeks to access;
   receiving a prompt at the first computing device from the second computing device over the secure channel, wherein the prompt requests a user voice response for use in making an authentication decision for the user based on the user voice response;
   capturing the user voice response in the non-secure portion of the first computing device and digitizing the user voice response in the secure portion of the first computing device; and
   sending the user voice response from the first computing device to the second computing device over the secure channel for use by the second computing device in making the authentication decision for the user based on the user voice response.

2. The method of claim 1, further comprising making an authentication decision at the first computing device for the user based on the user voice response.

3. The method of claim 1, further comprising receiving an indication of the authentication decision at the first computing device from the second computing device over the secure channel.

4. The method of claim 3, wherein the indication comprises at least one of an authentication token and a response from the service.

5. The method of claim 3, wherein the indication comprises an authentication failure message.

6. The method of claim 1, wherein making an authentication decision at the second computing device for the user based on the user voice response comprises at least one of a speaker discrimination process and a content discrimination process.

7. The method of claim 1, wherein making an authentication decision at the second computing device for the user based on the user voice response comprises an authentication fraud detection process.

8. The method of claim 1, further comprising receiving a secure data deletion instruction at the first computing device from the second computing device over the secure channel when the authentication decision is an authentication failure such that at least a portion of secure data stored on the first computing device is deleted.

9. The method of claim 1, further comprising enabling at the first computing device a login process wherein the user securely logs into the service.

10. The method of claim 1, wherein the first computing device comprises a non-secure endpoint device and a secure peripheral device coupled thereto.

11. The method of claim 1, wherein the first computing device comprises a secure device.

12. A computer program product comprising a non-transitory processor-readable storage medium having encoded therein executable code of one or more software programs, wherein the one or more software programs when executed by the one or more computing devices implement the steps of:
   executing at the first computing device a secure boot process;
   initiating at a first computing device establishment of a secure channel between the first computing device and a second computing device, wherein the first computing device comprises a non-secure portion and a secure portion and the second computing device at least partially hosts a service that a user of the first computing device seeks to access;
   receiving a prompt at the first computing device from the second computing device over the secure channel, wherein the prompt requests a user voice response for use in making an authentication decision for the user based on the user voice response;
   capturing the user voice response in the non-secure portion of the first computing device and digitizing the user voice response in the secure portion of the first computing device; and
   sending the user voice response from the first computing device to the second computing device over the secure channel for use by the second computing device in making the authentication decision for the user based on the user voice response.

13. An apparatus, comprising:
   a memory; and
   one or more processors operatively coupled to the memory forming a first computing device configured to:
   execute at the first computing device a secure boot process;
   initiate at the first computing device establishment of a secure channel between the first computing device and a second computing device, wherein the first computing device comprises a non-secure portion and a secure portion and the second computing device at least partially hosts a service that a user of the first computing device seeks to access;
   receive a prompt at the first computing device from the second computing device over the secure channel, wherein the prompt requests a user voice response for use in making an authentication decision for the user based on the user voice response;

capture the user voice response in the non-secure portion of the first computing device and digitize the user voice response in the secure portion of the first computing device; and send the user voice response from the first computing device to the second computing device over the secure channel for use by the second computing device in making the authentication decision for the user based on the user voice response.

14. The apparatus of claim 13, wherein the one or more processors are further configured to make an authentication decision at the first computing device for the user based on the user voice response.

15. A method, comprising:

in response to initiation at a first computing device following execution of a secure boot process at the first computing device, participating at a second computing device in establishment of a secure channel between the first computing device and the second computing device, wherein the first computing device comprises a non-secure portion and a secure portion and the second computing device at least partially hosts a service that a user of the first computing device seeks to access;

sending a prompt to the first computing device from the second computing device over the secure channel, wherein the prompt requests a user voice response for use in making an authentication decision for the user based on the user voice response, and wherein the user voice response is captured in the non-secure portion of the first computing device and digitized in the secure portion of the first computing device;

receiving the user voice response from the first computing device at the second computing device over the secure channel; and making the authentication decision at the second computing device for the user based on the user voice response.

16. The method of claim 15, wherein making an authentication decision at the second computing device for the user based on the user voice response comprises performing at least one of a speaker discrimination process, a content discrimination process and an authentication fraud detection process.

* * * * *